(No Model.) 2 Sheets—Sheet 1.
W. S. JOHNSON.
ELECTRIC VALVE FOR REGULATING TEMPERATURE, &c.
No. 301,059. Patented June 24, 1884.
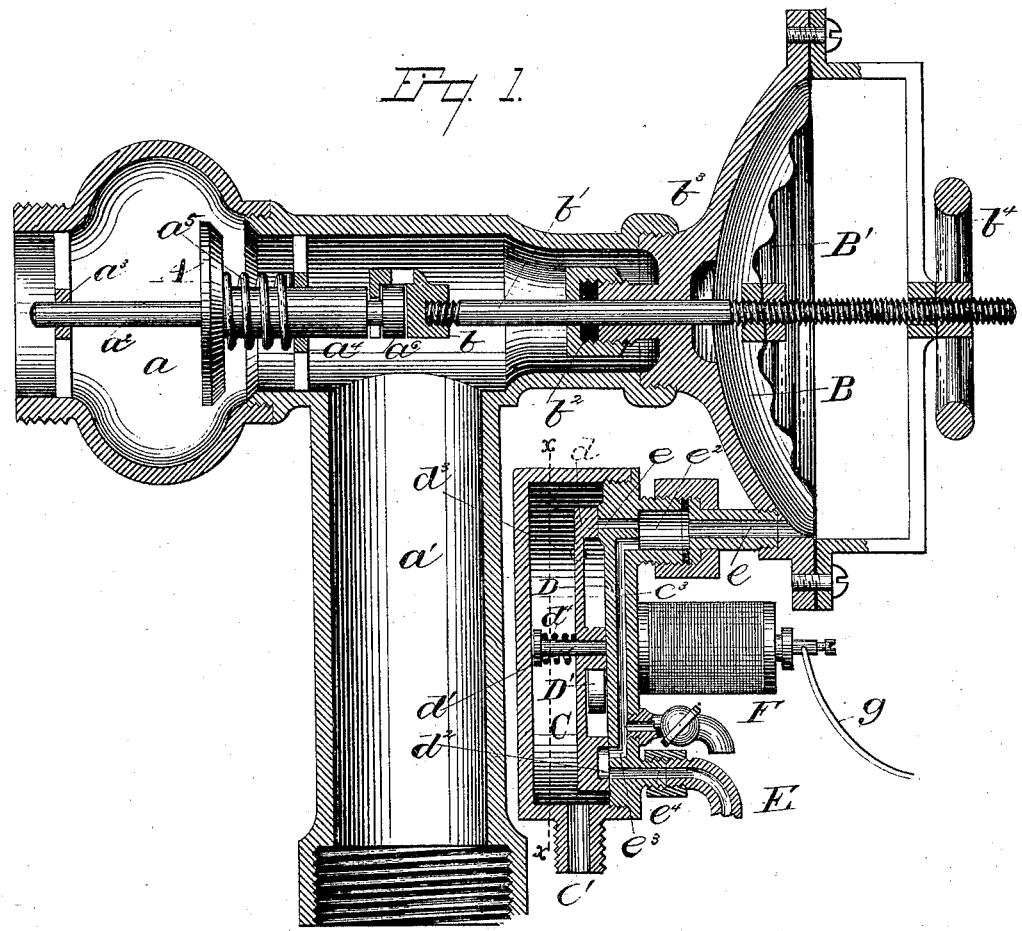
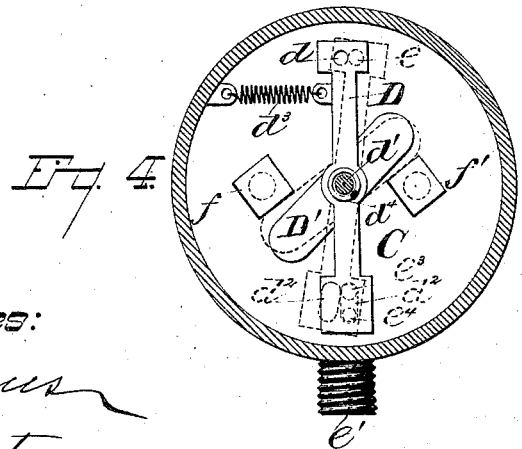
Witnesses:
Inventor:
Warren S. Johnson
By Stout & Underwood
Attorneys.

(No Model.)   2 Sheets—Sheet 2.

W. S. JOHNSON.
ELECTRIC VALVE FOR REGULATING TEMPERATURE, &c.

No. 301,059.   Patented June 24, 1884.

Witnesses:

Inventor.
Warren S. Johnson
By Stout & Underwood
Attorneys.

UNITED STATES PATENT OFFICE.

WARREN S. JOHNSON, OF MILWAUKEE, WISCONSIN, ASSIGNOR OF ONE-HALF TO WILLIAM PLANKINTON, OF SAME PLACE.

ELECTRIC VALVE FOR REGULATING TEMPERATURE, &c.

SPECIFICATION forming part of Letters Patent No. 301,059, dated June 24, 1884.

Application filed March 10, 1884. (No model.)

*To all whom it may concern:*

Be it known that I, WARREN S. JOHNSON, of Milwaukee, in the county of Milwaukee, and in the State of Wisconsin, have invented certain new and useful Improvements in Electric Valves for Regulating Temperature, &c.; and I do hereby declare that the following is a full, clear, and exact description thereof.

My invention relates to electric regulating-valves, and will be fully described hereinafter.

Figure 2:
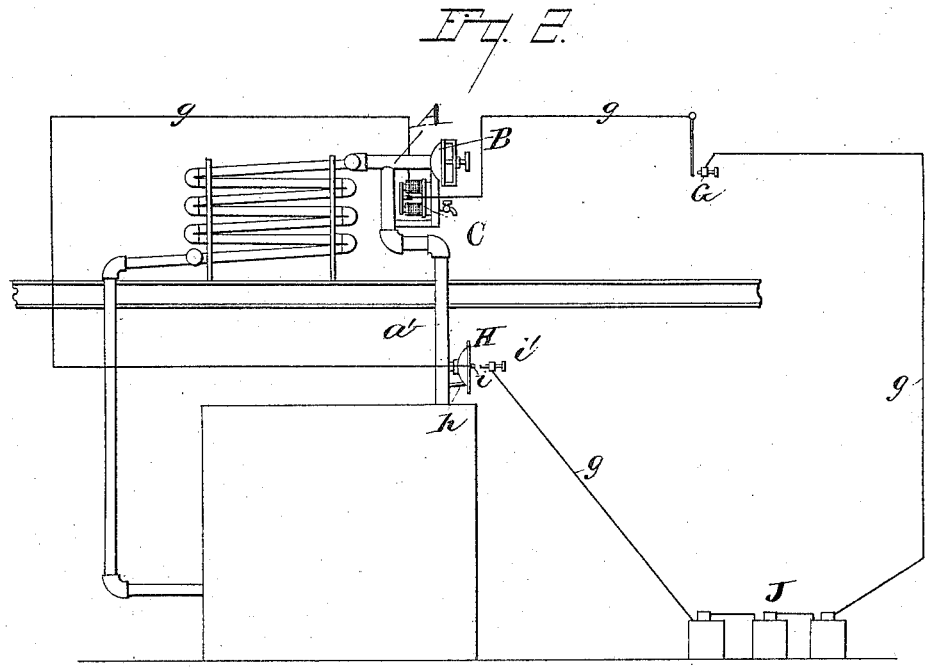
Figure 3:
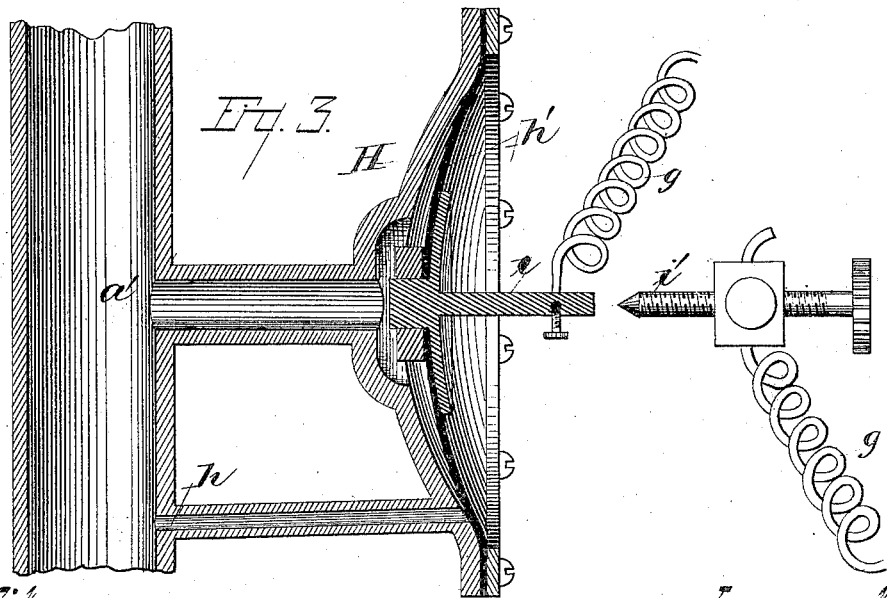

In the drawings, Figure 1 is a vertical section through center of my valve. Fig. 2 shows the application of my valve to a steam-heating apparatus. Fig. 3 is an enlarged vertical section of a device used to break the electric circuit, and Fig. 4 is a section of my electric valve on line $x$ $x$ of Fig. 1.

The object of my invention is to provide means whereby the valve of a steam, gas, or water passage may be operated automatically or from a distant point, as is often desirable. This result is obtained by connecting the main valve of said passage to the expansible wall of a chamber in which the steam, gas, or water is admitted either from the main passage or from an independent source through a small electrically-controlled valve.

A is the main valve, serving to control the passage of steam, gas, or water through the pipe $a$ $a'$. The stem $a^2$ of the valve is supported by the guides $a^3$ $a^4$, suitably held inside the pipe $a$. The valve A is kept normally open by means of the coiled spring $a^5$, one end of which rests against the valve, while the other end bears against the support $a^4$. This part of the stem $a^2$ is provided with a head, $a^6$, which fits loosely and is held in the clutch $b$, screwed on the end of the sliding rod $b'$. This latter is passed through the stuffing-box $b^2$ and the rear wall, $b^3$, of the chamber B. The outer end of the sliding rod $b'$ is threaded, and screws through a nut fastened on each side of the expansible corrugated plate B', which forms the movable front wall of the chamber B. Said threaded end extends out through the center of the spider $b^5$, screwed on front of the chamber B, and carries the hand-wheel $b^4$. Steam, gas, or water is admitted in the expansible chamber B through the passage $e$, which leads from said chamber to the chamber C, containing the electric valve D. The chamber C is connected, through the pipe $e'$, either with the main pipe $a'$ or with any other source wherefrom sufficient pressure can be obtained to expand the chamber B and operate the valve A. An enlargement, $e^2$, is provided in the passage $e$, and opposite the lower part of said enlargement opens another passage, $e^3$, which is formed in the front wall of the valve-chamber C. The opposite end of said passage $e^3$ opens in the said chamber, and slightly below it another passage, $e^4$, leads out of said chamber into the relief-pipe E. The valve D is pivoted with the armature D' on the stem $d'$, suitably fastened in the center of the front wall of chamber C, and by means of the spring $d^4$ is suitably maintained against the bearing-faces of said wall. The upper end of the valve D is perforated at $d$ to correspond with the orifice of the passage $e$, and in the bearing-face of the opposite end is formed a recess, $d^2$, of a length and width sufficient to cover the orifices of the passages $e^3$ and $e^4$. The valve is normally held closed by the spring $d^3$, as shown in the full lines of the drawings. The armature D' is then in proximity to the poles $f$ $f'$ of the electro-magnet F. Whenever the electric circuit is completed through the wires $g$ $g$, the electro-magnet being excited, the armature D' is attracted and the valve D swings around against its spring $d^3$, so that the perforation $d$ in its upper end is brought just opposite the orifice of the passage $e$, while the recess $d^2$ of its lower end stands opposite the solid bearing-face of the chamber-wall, thus closing the passages $e^3$ $e^4$ and opening communication through passage $e$ between the expansible chamber B and the main pipe $a'$, or any other source of pressure. The steam, gas, or water rushes through said passage $e$ and enters the chamber B, which will expand as much as its movable wall B' will permit. As this wall is firmly connected with the main valve A, this latter will be pulled to its seat against the spring $a^5$ by the movement of the wall, and will remain closed as long as the passage $e$ is kept open—that is, as long as the electric circuit is not broken. As it may sometimes be desirable to close the main valve by hand, this can be done by means of the hand-wheel $b^4$ and by opening the cock just above the pipe E, which may also be used to let out the water of condensation when the main valve is applied in steam-passages.

The application of my regulating-valve to a system of steam-heating is shown in Fig. 2. In this case the operation of the electric valve D is automatic, being effected through a circuit-closing device—a thermostat, G, made of any suitable form and set so as to operate when the apartment in which it is located has attained the desired temperature.

In order to prevent the waste of the battery J when the heating apparatus is not in use, I provide on the electric circuit an expansible chamber, H, connected with the steam-pipe $a'$ by the passage $h$. The movable wall $h'$ of this chamber bears the electrical contact-piece $i$. Another contact-piece, $i'$, is fastened at such a distance from the contact-piece $i$ that when the heating apparatus is not in use, as in summer, the thermostat G, situated in the apartment which the steam-generator serves to warm, Fig. 2, may operate, and still the electric circuit will be broken, since the contact-points $i$ and $i'$ of the circuit-closing device, Fig. 3, situated on the steam-pipe $a'$ are not now in contact. When the heating apparatus is in use, steam expands the chamber H, and the contact-pieces $i$ and $i'$ being thereby brought together, the thermostat G, Fig. 2, is adapted to do its automatic duty, as described above.

It will be noticed that in Fig. 1 the main valve A closes against the pressure of steam, gas, or water, as the case may be, and opens with the pressure. The object of this arrangement is to make the valve operative under a great range of pressure, for it is evident that if the valve were made to open against the pressure, the spring $a^5$ must have a resilient energy greater than the highest pressure under which the valve is to be used. Supposing this highest pressure to be twenty pounds to the square inch, and the area of the valve A to be one inch, the resilient energy of the spring $a^5$ must then be greater than twenty pounds in order to open the valve when it is once closed. As the practical area of the expansible wall $B'$ cannot well exceed twenty square inches, it will be seen that a pressure of one pound or less per square inch would not properly actuate the valve A. On the other hand, as in my device, the valve A closing against and opening with the pressure, the pressure on the wall $B'$ is always proportional to the pressure on the valve A, and therefore serves to actuate said valve under very low pressure.

Having thus described my invention, what I claim as new, and desire to secure by Letters Patent, is—

1. The combination of a valve serving to control a steam or other passage, an expansible chamber whose movable wall operates said valve when steam, gas, or water is admitted to said expansible chamber, and an electric valve adapted to admit steam, gas, or water, under pressure, into the expansible chamber, whereby the main valve is operated whenever the electric circuit is closed or opened, substantially as set forth.

2. The combination of a steam-generator, an electric valve used to control a passage in said generator, a suitable electric generator, and two circuit-closing devices in circuit with said electric generator and electric valve, one of said circuit-closing devices being a thermostat situated in the apartment which the steam-generator warms, and the other circuit-closing device consisting of an expansible chamber adapted when expanded to complete the circuit, and when contracted to keep the circuit broken, substantially as set forth.

3. The combination of an expansible chamber and a main valve connected thereto, the former having an inlet and outlet port controlled by an electric valve, with the armature of an electro-magnet, and the bar or lever of an electric valve, whereby when the electro-magnet operates the bar or lever of said valve the inlet-port is adapted to be opened at the same time that the outlet-port is closed, substantially as set forth.

4. The combination of a valve serving to control a steam or other passage, and adapted to close against and open with the pressure, an expansible chamber whose movable wall operates said valve when steam, gas, or water is admitted to said expansible chamber, and an electric valve adapted to admit steam, gas, or water under pressure into the expansible chamber, whereby the main valve is operated whenever the electric circuit is closed or opened, substantially as set forth.

5. The combination of a valve serving to control a steam or other passage, an expansible chamber whose movable wall operates said valve when steam, gas, or water is admitted to said chamber, and an electric valve consisting of an electro-magnet, its armature, and valves operated by the movement of said armature, whereby a movement of the armature in one direction admits the steam, gas, or water to said expansible chamber and prevents its exit therefrom, and operates the main valve in one direction, while a movement of said armature in the opposite direction prevents the admission of steam, gas, or water to said expansible chamber, but permits its escape therefrom, whereby the main valve is operated in the opposite direction, substantially as set forth.

In testimony that I claim the foregoing I have hereunto set my hand, at Milwaukee, in the county of Milwaukee and State of Wisconsin, in the presence of two witnesses.

WARREN S. JOHNSON.

Witnesses:
S. S. STOUT,
H. G. UNDERWOOD,